(12) United States Patent
Sahota

(10) Patent No.: US 9,907,114 B2
(45) Date of Patent: Feb. 27, 2018

(54) DEVICES, SYSTEMS, AND METHODS IMPLEMENTING A FRONT END PARTITION OF A WIRELESS MODEM

(71) Applicant: QUALCOMM Incorporated, San Diego, CA (US)

(72) Inventor: Gurkanwal S. Sahota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 13/831,265

(22) Filed: Mar. 14, 2013

(65) Prior Publication Data

US 2014/0269650 A1   Sep. 18, 2014

(51) Int. Cl.
*H04W 84/12* (2009.01)
*H04W 88/06* (2009.01)
*H04B 1/00* (2006.01)

(52) U.S. Cl.
CPC ............ *H04W 84/12* (2013.01); *H04B 1/006* (2013.01); *H04W 88/06* (2013.01)

(58) Field of Classification Search
None
See application file for complete search history.

(56) References Cited

U.S. PATENT DOCUMENTS 8,229,023 B2   7/2012   Sorrells et al.
8,416,758 B1 *  4/2013   Rousu et al. ............... 370/343

(Continued)

FOREIGN PATENT DOCUMENTS

GB   2491430 A   12/2012
WO   0111767 A1   2/2001

OTHER PUBLICATIONS

International Search Report and Written Opinion issued in International Patent Application No. PCT/US2014/021663 dated Sep. 10, 2014.

(Continued)

*Primary Examiner* — Faruk Hamza
*Assistant Examiner* — Cassandra Decker
(74) *Attorney, Agent, or Firm* — Arent Fox, LLP and Qualcomm, Incorporated

(57) ABSTRACT

This disclosure provides systems, methods, and apparatus for implementing a front-end partition of a wireless modems. In one embodiment, a wireless communication apparatus is provided. The wireless communication apparatus includes a wireless local area network modem including a first chip including a first portion of the wireless local area network modem configured to process signals and a second chip including a second portion of the wireless local area network modem. The wireless communication apparatus further includes a wide area network modem. The wireless communication apparatus further includes a combining circuit configured to combine the signals processed by the first portion and a transmission line configured to transmit the combined signals to the second chip and the wide area network modem. The wireless communication apparatus further includes a data modem including interference cancellation circuitry configured to cancel interference between the wireless local area network modem and the wide area network modem.

27 Claims, 7 Drawing Sheets

(56) References Cited

U.S. PATENT DOCUMENTS

| | | | |
|---|---|---|---|
| 8,811,922 B2* | 8/2014 | Mujtaba | H04W 68/00 |
| | | | 455/127.4 |
| 2006/0063494 A1* | 3/2006 | Zhang | H04B 1/18 |
| | | | 455/78 |
| 2006/0105720 A1 | 5/2006 | Nair | |
| 2006/0262743 A1* | 11/2006 | Kalhan et al. | 370/328 |
| 2007/0010285 A1 | 1/2007 | Schmidt | |
| 2007/0030116 A1 | 2/2007 | Feher | |
| 2007/0232358 A1 | 10/2007 | Sherman | |
| 2008/0085704 A1* | 4/2008 | Dieudonne | G01S 19/23 |
| | | | 455/423 |
| 2008/0207259 A1 | 8/2008 | Rofougaran | |
| 2009/0170447 A1* | 7/2009 | Marlett et al. | 455/82 |
| 2009/0176454 A1 | 7/2009 | Chen et al. | |
| 2009/0274202 A1 | 11/2009 | Hanke et al. | |
| 2010/0091688 A1* | 4/2010 | Staszewski et al. | 370/277 |
| 2010/0191859 A1 | 7/2010 | Raveendran | |
| 2010/0316027 A1* | 12/2010 | Rick | H04W 88/06 |
| | | | 370/336 |
| 2010/0323635 A1 | 12/2010 | Steeper et al. | |
| 2011/0105037 A1* | 5/2011 | Narasimha et al. | 455/63.1 |
| 2011/0205986 A1 | 8/2011 | Medapalli | |
| 2011/0212696 A1 | 9/2011 | Hahn et al. | |
| 2011/0292844 A1 | 12/2011 | Kwun et al. | |
| 2012/0009886 A1* | 1/2012 | Poulin | H04B 1/0064 |
| | | | 455/78 |
| 2012/0057508 A1* | 3/2012 | Moshfeghi | H04B 1/28 |
| | | | 370/277 |
| 2012/0057564 A1* | 3/2012 | Avital | H04W 48/16 |
| | | | 370/331 |
| 2012/0178386 A1 | 7/2012 | Pascolini et al. | |
| 2012/0329395 A1* | 12/2012 | Husted | H04B 1/406 |
| | | | 455/41.2 |
| 2012/0329407 A1* | 12/2012 | Rousu | H01Q 3/2605 |
| | | | 455/90.2 |

OTHER PUBLICATIONS

Written Opinion of the International Preliminary Examining Authority cated Mar. 2, 2015 issued in International Application No. PCT/US2014/021663.

Taiwanese Search Report issued in Taiwanese Patent Application No. 103107232 dated Jul. 24, 2015 (p. 1).

* cited by examiner

DEVICES, SYSTEMS, AND METHODS IMPLEMENTING A FRONT END PARTITION OF A WIRELESS MODEM

TECHNICAL FIELD

Embodiments of the present application relate generally to wireless communications, and more specifically to providing a front-end partition of a wireless modem.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power, and the like). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Mobile devices may support communications using multiple radio access technologies. Different radio access technologies may be used to expand the scope of services offered by the communications as a mobile device moves through different regions supporting different radio access technologies. Furthermore, different radio access technologies may be used to allow a user to engage in a variety of different forms of wireless communication activities. For example, a mobile device may support communications using radios that utilize technologies such as a wireless local area network (WLAN), Bluetooth, and/or a wide area network (WAN).

BRIEF SUMMARY

Various embodiments of systems, methods, and devices within the scope of the appended claims each have several aspects. In some embodiments all or some of these aspects can enable and provide the advantages and features of embodiments. Without limiting the scope of the appended claims, some prominent features are described herein.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One embodiment of the subject matter described in the disclosure provides a wireless communication apparatus. The wireless communication apparatus includes a wireless local area network modem including a first chip including a first portion of the wireless local area network modem configured to process a plurality of signals, and a second chip including a second portion of the wireless local area network modem. The wireless communication apparatus further includes a wide area network modem. The wireless communication apparatus further includes a combining circuit configured to combine the plurality of signals processed by the first portion of the wireless local area network modem and a transmission line configured to transmit the combined plurality of signals to the second chip and the wide area network modem. The wireless communication apparatus further includes a data modem including interference cancellation circuitry configured to cancel interference between the wireless local area network modem and the wide area network modem.

Another aspect of the subject matter described in the disclosure provides an implementation of a method implemented in a wireless communication apparatus. The method includes receiving a plurality of signals at a wireless local area network modem, and processing the plurality of signals using a first portion of the wireless local area network modem included on a first chip. The method further includes combining the plurality of signals processed using the first portion of the wireless local area network modem, transmitting at least one of the combined plurality of signals over a transmission line to a second chip including a second portion of the wireless local area network modem, and transmitting at least a second one of the combined plurality of signals over the transmission line to a wide area network modem. The method further includes canceling interference between the wireless local area network modem and the wide area network modem.

Yet another aspect of the subject matter described in the disclosure provides a wireless communication apparatus. The wireless communication apparatus includes a wireless local area network modem including a first chip including a first portion of the wireless local area network modem configured to process a plurality of signals, and a second chip including a second portion of the wireless local area network modem. The wireless communication apparatus further includes a wide area network modem. The wireless communication apparatus further includes means for combining the plurality of signals processed using the first portion of the wireless local area network modem, means for transmitting at least one of the combined plurality of signals to a second chip including a second portion of the wireless local area network modem, and means for transmitting at least a second one of the combined plurality of signals to a wide area network modem. The wireless communication apparatus further includes means for canceling interference between the wireless local area network modem and the wide area network modem.

Another aspect of the subject matter described in the disclosure provides a computer program product. The computer program product includes a computer readable medium. The computer readable medium includes code, when executed by a computer, causing the computer to receive a plurality of signals at a wireless local area network modem, and processing the plurality of signals using a first portion of the wireless local area network modem included on a first chip. The computer readable medium further includes code, when executed by a computer, causing the computer to combine the plurality of signals processed using the first portion of the wireless local area network modem. The computer readable medium further includes code, when executed by a computer, causing the computer to transmit at least one of the combined plurality of signals over a transmission line to a second chip including a second portion of the wireless local area network modem. The computer readable medium further includes code, when executed by a computer, causing the computer to transmit at least a second one of the combined plurality of signals over the transmission line to a wide area network modem. The computer readable medium further includes code, when executed by a computer, causing the computer to cancel interference between the wireless local area network modem and the wide area network modem.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

Figure 1:
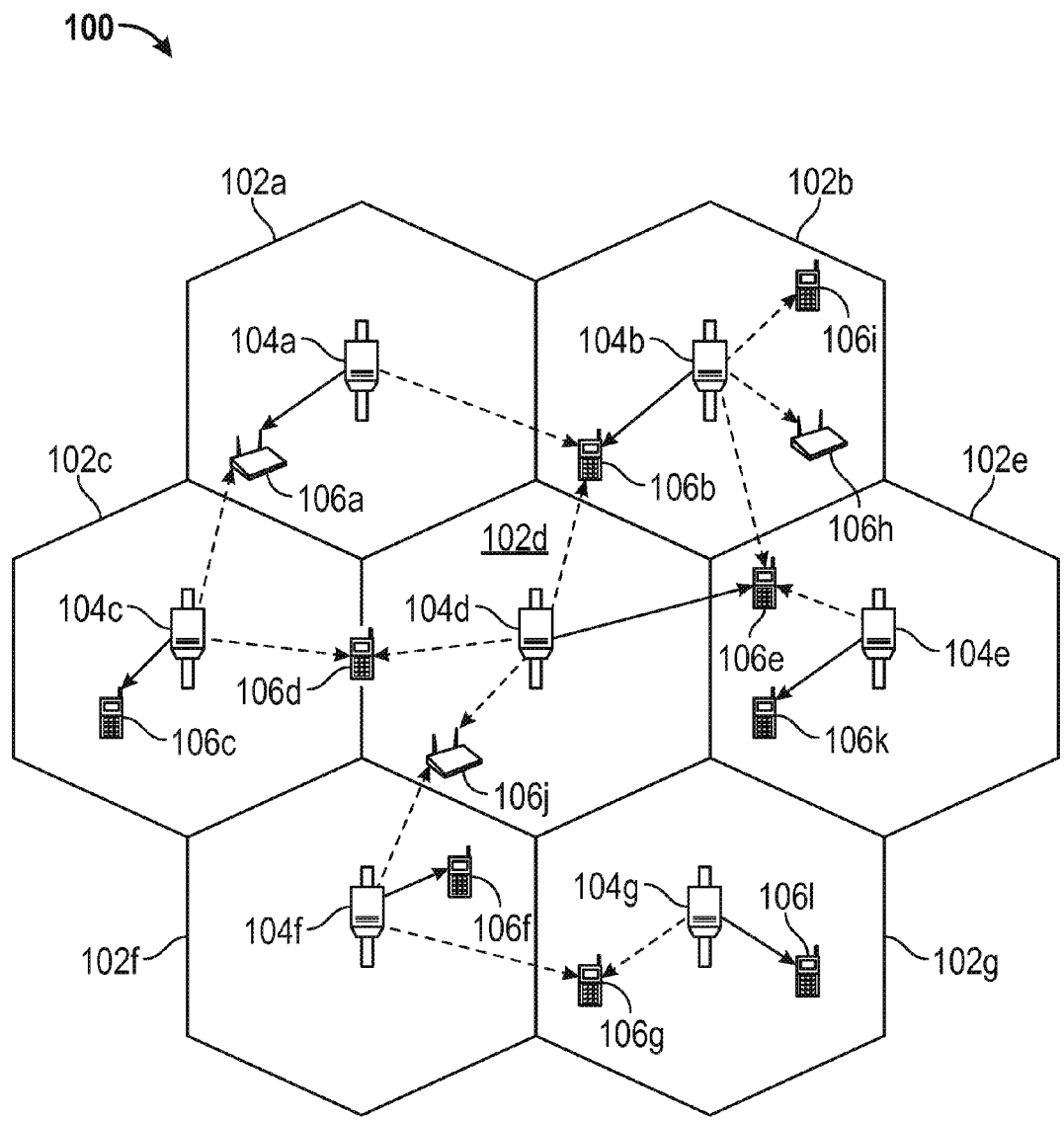
FIG. 1 shows an example of a simplified diagram of a wireless communication system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Like reference numerals may be used to denote like features throughout the specification and figures.

DETAILED DESCRIPTION

Various aspects of embodiments within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects or embodiments set forth herein. In addition, such an apparatus may be implemented and/or such a method may be practiced using other structure and/or functionality in addition to or other than one or more of the aspects or embodiments set forth herein.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Coexistence is an important feature in mobile devices, as it allows for multiple radios to work concurrently in a mobile device without interfering with each other. For example, a mobile device user may conduct a phone call operating in a frequency band near a WiFi frequency band and may also simultaneously receive WiFi data. Coexistence allows the user to optimally receive and transmit from many radios using different radio access technologies (e.g., WAN, WLAN, WiFi, Bluetooth, FM radio, and the like) at the same time without interference. In order to obtain good coexistence between radios operating using different radio access technologies, the antennas should have good isolation so that the transmitter of one radio does not desense the receiver of the another radio.

Integration of a baseband modem using a first radio access technology on the same die or chip as a modem implementing a second radio access technology may allow for better coexistence mitigation and interference cancellation techniques between the different radios for each radio access technology using interference cancellation techniques. However, as described in more detail below, there may be a variety of interference mechanisms between the radio access technologies that either degrade performance or result in more complicated front-end filters, causing reduced performance due to added insertion loss. Accordingly, system and methods are described herein including a printed circuit board (PCB) including a front-end partition designed for a mobile device that overcomes the limitations associated with integrating different modems.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and the like. The terms "networks" and "systems" are often used interchangeably. A CDMA network may implement a radio technology such as Universal Terrestrial Radio Access (UTRA), cdma2000, and the like. UTRA includes Wideband-CDMA (W-CDMA) and Low Chip Rate (LCR). A cdma2000 network may include IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). The cdma2000 and EV-DO standards are described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA may be useful especially for use in uplink communications where lower PAPR greatly benefits the mobile terminal in terms of transmit power efficiency. For example, SC-FDMA has been adopted as an option for the uplink multiple access method in LTE networks.

FIG. 1 illustrates an exemplary wireless communication network 100 in accordance with some embodiments. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations, access points, and the like), such as, for example, nodes 104a-104g. Each node 104 may provide communication coverage to a corresponding cell 102. The nodes 104 may interact with a plurality of access terminals (ATs), such as, for example, ATs 106a-106l. For ease of reference, each of the ATs 106a-106l may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device or apparatus (e.g., a mobile phone, router, personal computer, server, etc.) used by a user to send and receive voice or data communications over a communications network. An AT 106 may also be referred to herein as user equipment (UE), mobile station (MS), or a terminal device. As shown, ATs 106a, 106h, and 106j comprise routers. ATs 106b-106g, 106i, 106k, and 106l comprise mobile phones. However, each of ATs 106a-106l may comprise any suitable communication device.

An access terminal 106 may be multimode, capable of operating using different radio access technologies (RATs). For example, AT 106 may be capable of operating using one or more RATs defined by standards such as wideband code division multiple access (WCDMA), cdma2000 1×, 1×-EV-DO, LTE, eHRPD, 802.11, and the like. An AT 106 may perform a plurality of tasks across various communication systems using these different RATs. The communication may be accomplished using a plurality of collocated transmitters and/or receivers, or may be communicated using one single transmitter and/or receiver.

Figure 2:
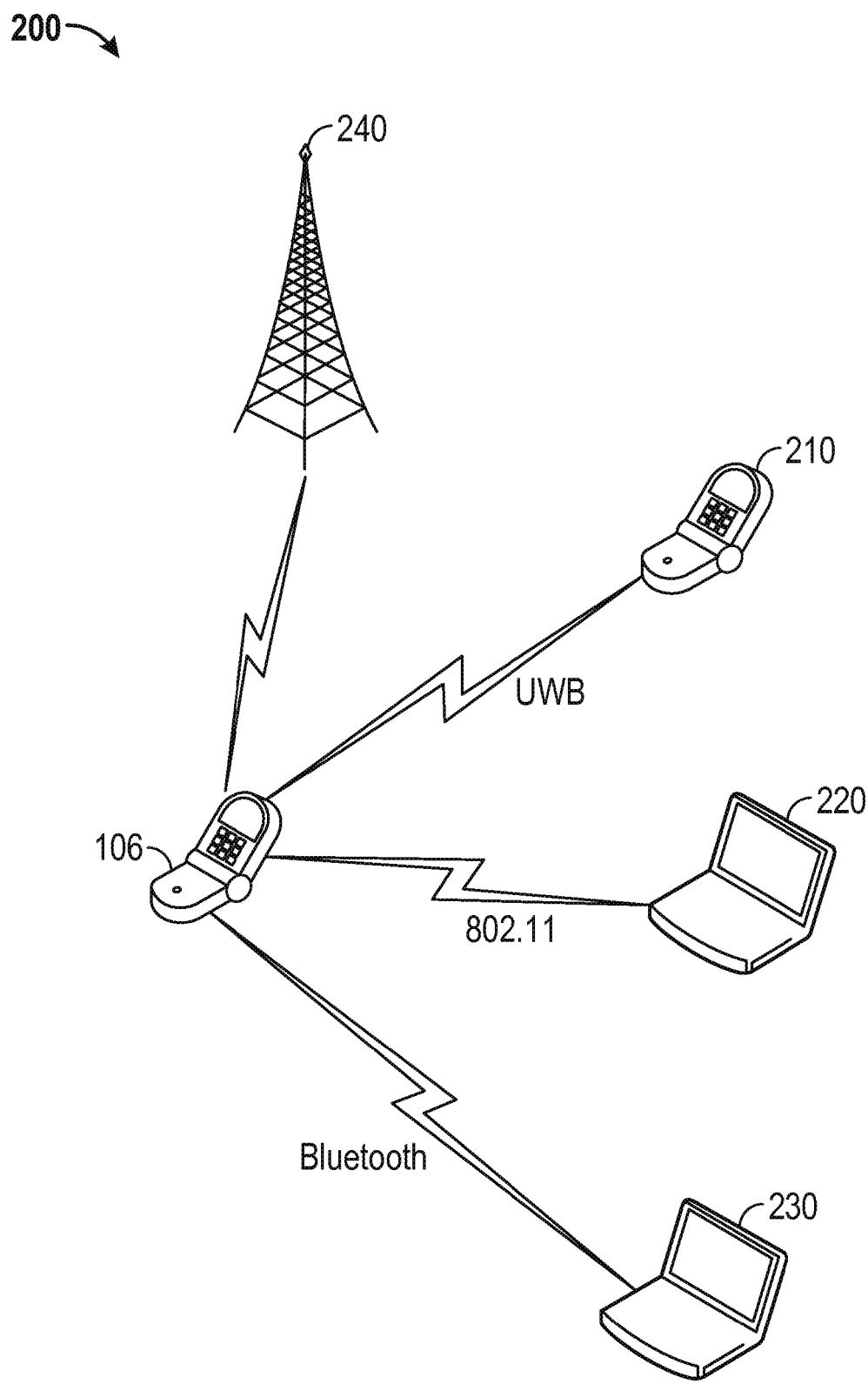
FIG. 2 shows an example of a functional block diagram of an exemplary mobile device operating in a wireless communication network in accordance with some embodiments.

FIG. 2 shows an example of a functional block diagram of an exemplary access terminal (AT) 106 operating in a wireless communication network 200 in accordance with some embodiments. The wireless communication network 200 comprises the AT 106, a second wireless communications device 210, a third wireless communications device 220, a fourth wireless communications device 230, and a cellular tower 240. The wireless communication network 200 may be configured to support communication between a multitude of devices, such as the wireless communications devices 106a, 210, 220, 230, and tower 240. The mobile wireless communications devices (e.g., 106a, 210, and 220) may comprise, for example, personal computers, PDAs, music players, video players, multimedia players, televisions, electronic game systems, digital cameras, video camcorders, watches, remote controls, headsets, and so on. The AT 106 may be simultaneously in communication with each of devices 210, 220, 230, and 240 via one or more transmitters and/or receivers collocated on access terminal 106.

With continuing reference to FIG. 2, the AT 106 may communicate with other wireless communications devices (e.g., 210, 220) over a variety of communication channels. The communication channels may comprise Ultra-Wide Band (UWB) channels, Bluetooth channels, 802.11 channels (e.g., 802.11a, 802.11b, 802.11g, 802.11n, etc.), infrared (IR) channels, ZigBee (802.15) channels, or a variety of other channels, as is well known in the art. In one embodiment, the channel may be a UWB channel conforming to the ECMA-368 standard. Other channels would be readily recognized as possible as well.

The wireless communications network 200 may comprise a wireless local area network (WLAN) covering a physical area, such as a home, office, a group of buildings, or the like. A WLAN may use standards, such as an 802.11 standard and/or other standards, for wireless communications. For example, the wireless communications network 200 may include a WiFi local area network using 802.11 standards. In some embodiments, a WLAN may use peer-to-peer communication in which the wireless communication devices directly communicate with each other. In some embodiments, the wireless communications network 200 may also comprise global positioning system (GPS) capabilities.

The wireless communications network 200 may also comprise a wireless personal area network (WPAN), spanning, for example, an area of a few meters. A WPAN may use standards such as infrared, Bluetooth, a WiMedia based UWB standard (e.g., ECMA-368), a ZigBee standard, and/or other standards for wireless communications. A WPAN may use peer-to-peer communication in which the wireless communication devices directly communicate with each other.

The wireless communications network 200 may also comprise a wide wireless area network (WWAN). The WWAN may use standards such as WCDMA, cdma2000 1×, 1×-EV-DO, LTE, eHRPD and the like. The access terminal 106 may connect to another network, such as a wireless communications network or the Internet, through network 200. The messages sent across the wireless communications network 200 may comprise information related to various types of communication (e.g., voice, data, multimedia services, and the like) and may be of varied degrees of importance to the user of access terminal 106, as described in greater detail below.

Although the following embodiments may refer to FIG. 1 or 2, one will recognize that they are readily applicable to other communication standards. For example, some embodiments may be applicable in a UMTS communication system. Some embodiments may be applicable in an OFDMA communication system. The communication system 200 may further comprise any type of communication system including, but not limited to, a WCDMA system, a GSM system, a CDMA system, and an OFDM system.

Figure 3:
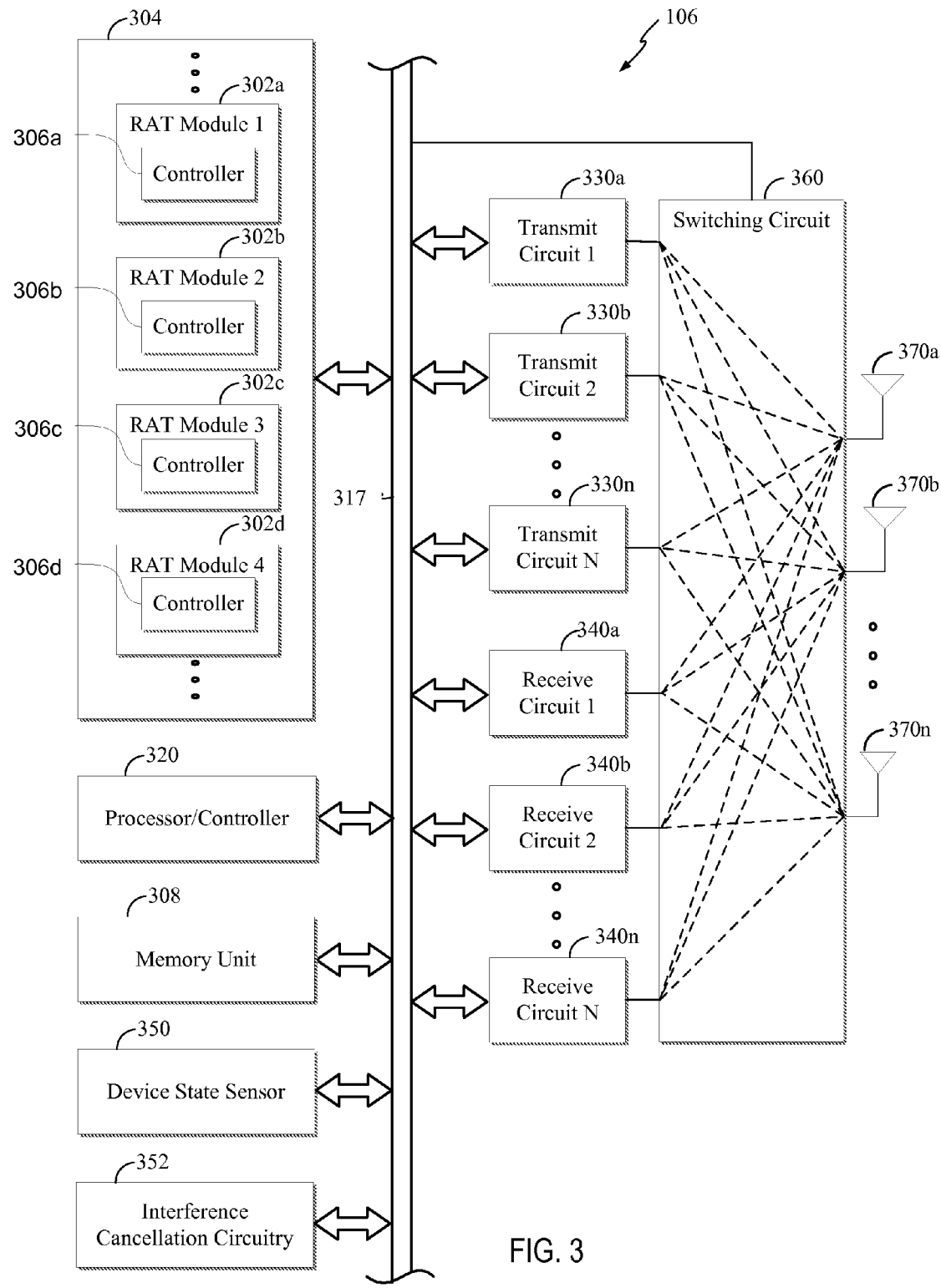
FIG. 3 illustrates various components that may be utilized in a wireless device that may be employed within the wireless communication system of FIGS. 1 and 2.

FIG. 3 is a functional block diagram depicting an exemplary access terminal 106 shown in FIGS. 1 and 2 in accordance with an embodiment. The access terminal 106 may be multimode, capable of using different radio access technologies (RATs) such as any of the radio technologies mentioned above with reference to FIGS. 1 and 2. The access terminal 106 is an example of a device that may be configured to implement the various methods described herein. The access terminal 106 may implement any of the devices illustrated in FIGS. 1-2.

The access terminal 106 includes a central data bus 317 linking several circuits. The circuits include a controller/processor 320, a memory unit 308, and RAT circuitry 304, which may include a number of various RAT modules such as modules 302a, 302b, 302c, and 302d, for example. The processor/controller 320 may comprise or be a component of a processing system implemented with one or more processors. The processor/controller 320 may be configured as or referred to as an application processor subsystem 320 in some embodiments. The one or more processors of the processor/controller 320 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In addition, the processor/controller 320 may be configured to communicate with and control the operation of various modules configured for different RATs. Each of the RAT modules 302a, 302b, 302c, and 302d may implement a specific RAT and may each individually include additional memory modules, communication components, and functions which are applicable to the RAT type implemented by the module. Each RAT module 302a, 302b, 302c, and 302d may include baseband circuitry specific to each radio access technology and may collectively be included in a mobile data modem (MDM). Each RAT module 302a, 302b, 302c, and 302d may further include a controller 306a, 306b, 306c, and 306d, each of which may be referred to herein as a modem processor 306a, 306b, 306c, and 306d that may be used to control the operation of each RAT. For ease of reference, controllers 306a, 306b, 306c, and 306d may hereinafter be referred to as a RAT controller 306. Furthermore, RAT controllers 306a, 306b, 306c, and 306d may be provided independently of each module 302a, 302b, 302c, and 302d for controlling the modules. In some embodiments, the processor 320 may be configured to perform the functions of the RAT controller 306. Furthermore, each RAT module may include its own transceiver(s), including one or more antennas (not shown). The RAT modules may implement any of the RAT types discussed above with reference to FIGS. 1-2, or any other readily recognizable RAT types.

The access terminal 106 further comprises one or more transmit circuits 330a, 330b, through 330n. Transmit circuits 330a, 330b, through 330n may also be referred to as transmit chains having one or more components configured to transmit wireless communications signals via antennas 370a, 370b, through 370n. For example, transmit circuit 330a may include a modulator (not shown), a digital-to-analog (D/A) converter (not shown), an amplifier (not shown), as well as other circuitry for modulating and preparing wireless communications signals for transmission via antennas 370a, 370b, through 370n. In some cases, the RAT circuitry 304 may include transmit circuits 330a, 330b, through 330n where each RAT module 302a, 302b, 302c, and 302d may include one of the transmit circuits 330a, 330b, through 330n. As such, transmit circuits 330a, 330b, through 330n may be configured to transmit according to one or more radio access technologies associated with one of RAT modules 302a, 302b, 302c, and 302d. In some cases, one or more of transmit circuits 330a, 330b, through 330n may be activated or deactivated. In one aspect, the transmit circuits 330a, 330b, through 330n may include components particular to one of the RAT modules 302a, 302b, 302c, and 302d. For example, a RAT module 302a may implement wireless communications using OFDM or CDMA (e.g., WCDMA, cdma2000, and the like), while a second RAT module 302b may implement a wireless communications using a WLAN, such as a WiFi network. As such, one transmit circuit 330a may include components configured for OFDM or CDMA communications while a second transmit circuit 330b may include components configured for WLAN communications.

The exemplary access terminal 106 as shown further comprises one or more receive circuits 340a, 340b, through 340n. Receive circuits 340a, 340b, through 340n may also be referred to as receive chains having one or more components configured to receive wireless communications signals via any of antennas 370a, 370b, through 370n. For example, receive circuit 340a may include an amplifier (not shown), an analog-to-digital converter (not shown), a demodulator (not shown), as well as other circuitry for receiving and demodulating wireless communications signals received via any of antennas 370a, 370b, through 370n. In some cases, the RAT circuitry 304 may include receive circuits 340a, 340b, through 340n where each RAT module 302a, 302b, 302c, and 302d may include one of the receive circuits 340a, 340b, through 340n. As such, each of receive circuits 340a, 340b, through 340n may be configured to receive according to a radio access technology associated with one of the RAT modules 302a, 302b, 302c, and 302d. In some cases, one or more of the receive circuits 340a, 340b, through 340n may be activated or deactivated.

Transmit circuits 330a, 330b, through 330n may process and convert high-frequency (HF) signals to base-band signals for transmission. Receive circuits 340a, 340b, through 340n in turn may process and buffer received signals before sending the signals to the data bus 317. Transmit circuits 330a, 330b, through 330n may process and buffer the data from the data bus 317 before transmitting the signals from the access terminal 106. The processor/controller 320 controls the proper timing of the various components of the access terminal 106 by allocating the time slots for the data sensing and processing for the different frequency bands for transmit circuits 330a, 330b, through 330n and receive circuits 340a, 340b, through 340n.

Each of transmit circuits 330a, 330b, through 330n and receive circuits 340a, 340b, through 340n may be configured to respectively transmit and receive via one or more of the antennas 370a, 370b, through 370n. Individual transmit circuits 330a, 330b, through 330n and receive circuits 340a, 340b, through 340n may transmit and receive information associated with a different radio access technology via a particular antenna 370a, 370b, through 370n. For example, for simultaneous voice and data modes, one transmit circuit 330a may be used for transmitting voice communications via antenna 370a while another transmit circuit 330b may be used for transmitting non-voice data via antenna 370b. The processor/controller 320 directs the multiple transmit circuits 330a, 330b, through 330n and receive circuits 340a, 340b, through 340n for detecting and/or processing of signals from the different frequency bands via antennas 370a, 370b, through 370n. Antennas 370a, 370b, through 370n may be placed in different physical locations within the access terminal 106, as illustrated below with respect to FIG. 4. For example, antennas 370a, 370b, through 370n may be at opposite (e.g., distal or lateral) ends or corners of the access terminal 106 or adjacent to each other. Generally, antennas 370a, 370b, through 370n can be located at similar or distinct places as desired or in accordance with device design.

In some embodiments, a switching circuit 360 may be provided to allow a processor/controller 320 to select the antennas 370a, 370b, through 370n for which transmit circuits 330a, 330b, through 330n or receive circuits 340a, 340b, through 340n are configured to transmit and receive. The switching circuit 360 may include circuitry configured to switch M inputs corresponding to transmit circuits 330a, 330b, through 330n and receive circuits 340a, 340b, through 340n to N outputs corresponding to antennas 370a, 370b, through 370n. As shown in FIG. 3, there may be more or less than three transmit circuits 330a, 330b, through 330n, three receive circuits 340a, 340b, through 340n, and three antennas 370a, 370b, through 370n. As one example, the switching circuit 360 may be configured as a crossbar switch or other suitable switching circuitry. The processor/controller 320 may be configured to switch transmit circuits 330a, 330b, through 330n and receive circuits 340a, 340b, through 340n to respectively transmit and receive via any combination of antennas 370a, 370b, through 370n. In some embodiments, the transmit circuits 330a, 330b, through 330n, and receive circuits 340a, 340b, through 340n may be included within RAT modules 302a, 302b, 302c, and 302d. As such, in some embodiments, the switching circuit 360 may be configured to switch each RAT module 302a, 302b, 302c, and 302d to respectively transmit and receive via any combination of antennas 370a, 370b, through 370n. In some embodiments, a RAT module 302a may determine an appropriate antenna and may direct the switching via the switching circuit 360. In other embodiments, the processor/controller 320 may direct the switching. In other embodiments, the RAT module 302a in combination with the processor/controller 320 may direct the switching.

The processor/controller 320 performs the function of data management on the data bus 317 and the function of general data processing, including executing the instructional contents of the memory unit 308. The memory unit 308 may include a set of modules and/or instructions. Instructions particular to the process steps of the access terminal 106 as shown and described in the embodiments described below can be coded in the various functions included in the contents of the memory unit 308. In one embodiment, the memory unit 308 is a RAM (Random Access Memory) circuit. Some communication device functions, such as some switching functions, are software routines, modules, and/or data sets. The memory unit 308 can be tied to another memory circuit (not shown), which may be of the volatile or nonvolatile type. As an alternative, the memory unit 308 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. In addition, the memory unit 308 can be a combination of ASIC and memory circuitry of the volatile type and/or non-volatile type.

The access terminal 106 may further include a device state sensor 350. The device state sensor may be configured to detect one or more states or modes of a device according to how the device is being used, handled, and/or positioned. For example, the device state sensor 350 may be configured as a proximity sensor that may be configured to detect a proximity of the user or other object with respect to the access terminal 106. In one embodiment, the device state sensor 350 includes multiple proximity sensors. Each of the multiple proximity sensors may be placed next to the antennas 370a, 370b, through 370n. Each of the multiple proximity sensors is configured to detect whether an object is in proximity to (e.g., blocking) a respective antenna 370a, 370b, through 370n. The device state sensor 350 may further include and/or be configured as an orientation sensor that may be configured to detect the orientation of the access terminal 106 with respect to the user of the access terminal 106. For example, the orientation sensor may include any suitable sensor, such as an accelerometer, a gyroscope, or the like. The device state sensor 350 may further include and/or be configured as other types of sensors for detecting a temporary condition or state of the access terminal 106. While shown as one functional block, multiple device state sensors of different types may be included. For example, the access terminal 106 may include both a separate proximity sensor and a separate orientation sensor.

The access terminal 106 may also include interference cancellation circuitry 352. The interference cancellation circuitry 352 may subtract out interfering signals from one radio access technology that is interfering with a signal of another radio access technology. For example, a transmit circuit 330a, for example, may be transmitting a WLAN signal that includes interference that is riding upon a received signal of a WAN receiver 330b, for example, and vice versa. The interference cancellation circuitry 352 may subtract the interfering portion of the transmitted signal in order to cancel the interference from the received signal. The interference cancellation circuitry 352 allows multiple radios (including a receive and transmit circuit pair) using different radio access technologies to coexist and to work concurrently without interfering with each other. Accordingly, coexistence allows the access terminal 106 to optimally receive and transmit from a plurality of radios using different radio access technologies (e.g., WiFi, cellular, Bluetooth, FM radio, and the like) at the same time without interference.

In this specification and the appended claims, it should be clear that the terms "circuit," "circuitry," and the like are construed as a structural term and not as a functional term. For example, circuitry can be an aggregate of circuit components, such as a multiplicity of integrated circuit components, in the form of processing and/or memory cells, modules, units, blocks, and the like, such as shown and described in FIG. 3.

Although described separately, it is to be appreciated that functional blocks described with respect to the access terminal 106 need not be separate structural elements. For example, the processor 320, the memory unit 308, and RAT modules 302a, 302b, 302c, and 302d may be embodied on a single chip. The processor 320 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

As described above, coexistence is important in mobile devices, as it allows for multiple radios that utilize different radio access technologies to work concurrently without interfering with each other. For example, a mobile device user may conduct a phone call operating in a frequency band near a WiFi band and may also simultaneously receive WiFi data. Coexistence allows the user to optimally receive and transmit from many radios (e.g., WiFi, WAN, Bluetooth, FM radio, etc.) at the same time without interference. In order to obtain good coexistence between different radios of different radio access technologies, such as WAN and WLAN/Bluetooth, the corresponding antennas should have good isolation so that the transmitter of one radio does not desense the other radio's receiver.

Figure 4:
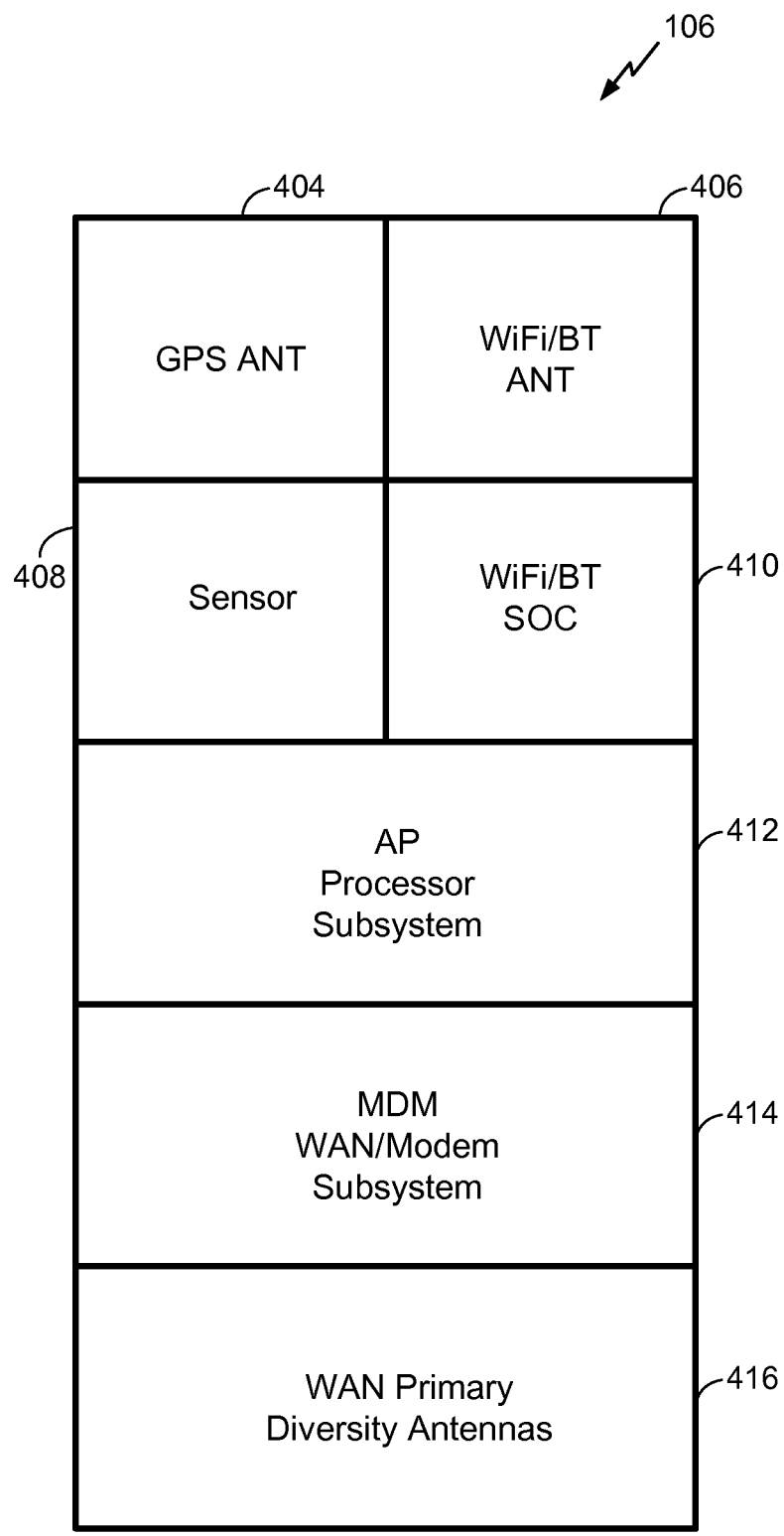
FIG. 4 illustrates an example of a floor plan of an embodiment of the access terminal shown in FIG. 3 in accordance with some embodiments.

FIG. 4 illustrates an example of a floor plan of an access terminal 106 including an external application processor 412, antennas 404, 406, 416, sensor 408, and various subsystems 412, 414 according to a discrete WiFi/Bluetooth solution. While the following description relates to WAN and WiFi/Bluetooth radio access technologies, a person of skill in the art will recognize that the description applies generally to any other types of radio access technologies that may be included as part of the access terminal 106.

The WiFi/Bluetooth antenna 406 and the GPS antenna 404 are located on the top of the access terminal 106 and the WAN antennas 416 are located at the bottom of the access terminal 106 for maximal physical separation. The physical separation helps to provide sufficient isolation to obtain proper coexistence. In some embodiments, a global positioning system (GPS) receiver (not shown) may be integrated in the same die or chip as the WAN transceiver (not shown). In the floor plan illustrated in FIG. 4, a transmission line (not shown) may connected from the GPS antenna 404 to the GPS transceiver in order to route the GPS signal to the GPS transceiver. Further, in order to reduce the impact of the insertion loss of the transmission line, a filter and a low noise amplifier (LNA) may be added and placed close to the GPS antenna 404, and the output of the LNA may be routed to the GPS transceiver.

Rather than using a discrete WiFi/Bluetooth solution, such as that illustrated in FIG. 4, the WAN baseband modem may be integrated on the same die or chip as the WiFi/Bluetooth modem. The integration of the WAN and WiFi/Bluetooth modems allows for better coexistence mitigation and interference cancellation techniques between the WiFi and WAN radios (including a receive and transmit circuit pair) using interference cancellation techniques. For example, interference cancellation techniques may include non-linear interference cancellation (NLIC). Various types of interference mechanisms between the WiFi system and the WAN system degrade performance and/or result in more complicated front-end filters, which reduces performance even further due to added insertion losses. The added insertion loss degrades sensitivity, max power, and power added efficiency (PAE) of the transmitter. PAE is the ratio of the transmitted radio frequency (RF) power to the direct current (dc) power used in the power amplifier. A higher PAE indicates that the transmitter is more power efficient.

Integrating the WiFi modem with the WAN baseband modem introduces various challenges to designing the printed circuit board (PCB) upon which the above components reside. For example, a WiFi/Bluetooth RF modem transceiver and WiFi/Bluetooth front-end (e.g., including amplifiers, filters, multiplexers, etc.) may be located near the WiFi/Bluetooth antenna. In this example, the routing of analog baseband receive and transmit signals, including the in phase (I) and quadrature components (Q) of the complex signal constellation, creates problems due to the long routing and large baseband bandwidths for WLAN channels. The problems arise because the Q and I lines, control lines, and power lines have to be routed from a mobile data modem (MDM) 414 at the bottom of the PCB to the top of the PCB where the WiFi front-end circuitry, modem, and antenna are located (see FIG. 1). These lines must be routed through an application processor (AP) subsystem 412, which routes a large number of noisy digital signals to the display, memory, sensors, wired connectivity, and other parts of the access terminal 106. As a result, the routing of these signals from the MDM 414 to the WiFi/Bluetooth RF modem transceiver and WiFi/Bluetooth front-end may be too complex for real-world applications.

In another example that involves challenges relating to the integration of a WiFi modem with a WAN baseband modem, the WiFi/Bluetooth RF transceiver and WiFi/Bluetooth front-end may be located near the WAN MDM. In this example, the RF input lines must be routed across the PCB for distribution of the WiFi transmit and receive signals. This routing of the RF input lines may extensively degrade the performance, due in part to the fact that sensitive RF signals will have to be routed through a noisy part of the board. Further, shielding may be provided, but may add extra transmission lines and board area.

Accordingly, in order to overcome the challenges described above, a PCB may be designed for an access terminal 106 so that the WiFi/Bluetooth RF front-end portion of the WiFi/Bluetooth modem is physically separated from the rest of the WiFi/Bluetooth modem, and the power amplifiers (PA), low noise amplifiers (LNA), and switches of the front-end portion may be placed in a separate chip that can be placed near the WiFi/Bluetooth and GPS antennas.

Figure 5:
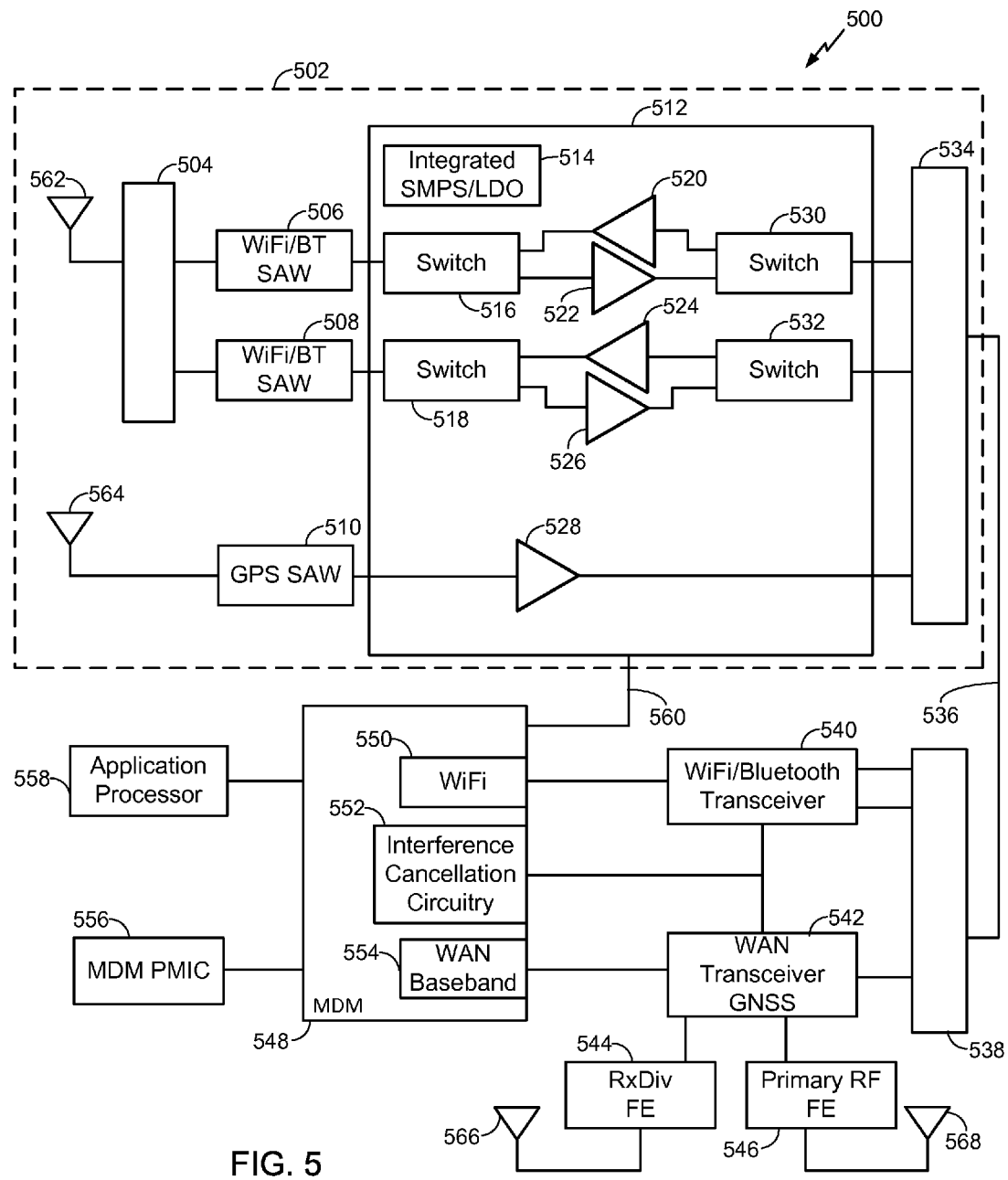
FIG. 5 illustrates a schematic diagram of an exemplary printed circuit board of an access terminal that may be employed within the wireless communication system in accordance with some embodiments.

FIG. 5 illustrates a schematic diagram of an exemplary printed circuit board 500 of an access terminal 106 that may be employed within the wireless communication system in accordance with some embodiments. The printed circuit board 500 includes a WiFi/Bluetooth modem and a WAN modem. The Wifi-Bluetooth modem includes a WiFi/Bluetooth radio frequency (RF) front-end portion 502 and a remaining portion, the remaining portions including the WiFi/Bluetooth transceiver 540 and the WiFi baseband processor 550. The front-end portion 502 and the remaining portion are physically separated from each other in the access terminal 106 by a distance. The WAN modem includes the WAN transceiver 542 and the WAN baseband processor 554. For example, a first chip may include the front-end portion 502 and may be physically separated from a second chip that includes the remaining portion of the WiFi/Bluetooth modem. The first chip may be located at the top of the access terminal 106 near the WLAN/Bluetooth antennas 562, 564, and the second chip may be located at the bottom of the access terminal 106 near the mobile data modem (MDM) 548. In some embodiments, the first chip and the second chip may be separated by a distance of 1 inch, 1.5 inches, 2 inches, 2.5 inches, 3 inches, 3.5 inches, 4 inches, 4.5 inches, 5 inches, and the like. While certain specific distances are disclosed herein, a person of skill in the art will recognize that the description applies generally to any other distance such that the front-end portion 502 may be located near the WLAN/Bluetooth antennas and the remaining portion of the WLAN/Bluetooth modem may be located near the mobile data modem (MDM) 548.

The WiFi/Bluetooth radio frequency (RF) front-end portion 502 includes components of the circuit board 500 surrounded by the dotted line illustrated in FIG. 5. The WiFi/Bluetooth RF front-end portion 502 of the WiFi/Bluetooth modem includes a WiFi/Bluetooth antenna 562, a GPS antenna 564, a diplexer 504, WiFi/Bluetooth surface acoustic wave filters (SAWs) 506, 508 (e.g., a 2.4 GHz SAW and a 5 GHz SAW), a GPS SAW 510, power amplifiers (PA) 520, 524, low noise amplifiers (LNA) 522, 526, 528, switches 516, 518, 530, 532 (e.g., single pole 2 throw (SP2T) switches), and a combiner 534 (e.g., a triplexer).

The front-end portion 502 receive various RF signals via antennas 562 and 564, and processes these RF signals for transmission over transmission line 536. The signals are combined and transmitted over the transmission line 536 as RF signals, and are not converted to baseband signals until being received by the WAN transceiver 542 and/or the rest of the WiFi/Bluetooth RF modem, including the WiFi/Bluetooth transceiver 540 and the WiFi baseband processor 550. For example, the signals may be received as modulated RF signals that are at much higher frequencies than the corresponding baseband signal. RF frequencies may be in the range of approximately 3 kHz to 300 GHz, and the corresponding baseband signal may be in a range from 0 Hz to a particular cut-off frequency. Prior to being transmitted, the baseband signal may be copied or modulated up to a higher RF frequency for transmission over the network. The modulation to a higher frequency may be required because the communications data included on the carrier signal cannot be transmitted at low baseband frequencies without distortion. Once received, the RF frequencies may be converted back to baseband frequencies by the baseband circuitry of the WLAN/Bluetooth modem and the WAN modem. The circuit board 500 includes the WLAN/Bluetooth baseband circuitry in the remaining portion of the WLAN/Bluetooth modem. Accordingly, the signals are not converted to baseband until after they are combined by the combiner 534 and transmitted over the transmission line 534.

Included within the front-end portion 502 is a RF front-end chip 512 that includes the PAs 520, 524, LNAs 522, 526, 528, and switches 516, 518, 530, 532. In some embodiments, a switch mode power supply (SMPS) and/or a low drop out voltage regulator (LDO) may be included in the front-end chip 512. For example, the power supply for the RF front-end chip 512 may be generated locally directly from battery voltage using the integrated SMPS and/or LDO 514.

As illustrated in FIG. 5, the WiFi/Bluetooth RF front-end portion 502 is separated from the rest of the WiFi/Bluetooth RF modem, including the WiFi/Bluetooth transceiver 540 and the WiFi baseband processor 550. Furthermore, the PAs 520, 524, LNAs 522, 526, 528, and switches 516, 518, 530, 532 are included on a separate chip 512 that can be placed near the remaining components of the front-end portion 502. The remaining components, including the WiFi/Bluetooth antenna 562, GPS antenna 564, diplexer 504, WiFi SAWs 506 and 508, GPS SAW 510, and triplexer 534, may be discrete components or may be integrated on the chip 512.

In some embodiments, the antennas 562 and 564 may receive various signals for processing by the front-end portion 502. For example, the antenna 562 may receive 2.4 GHz WiFi and/or Bluetooth signals and 5 GHz WiFi signals. The antenna 564 may receive GPS signals. The signals are separated using diplexer 504 and are output to the SAWs 506, 508, and 510, which are configured to filter the signals. For example, the SAW 506 may include a 2.4 GHz SAW configured to filter the 2.4 GHz signals and the SAW 508 may include a 5 GHz SAW configured to filter the 5 GHz signals. The SAWs 506, 508, and 510 perform band-pass filtering to output the appropriate signals to the chip 512 without any unwanted interfering frequencies. In some embodiments, if a delay is desired, the SAWs 506, 508, and 510 may be used to convert each of the received electrical signals to an acoustic wave, and then convert each of the acoustic waves back to an electrical signal to provide delays in the signals. In some embodiments, other filters may be used instead of the SAWs, such as quartz crystals, inductor-capacitor (LC) filters, or waveguide filters.

In some embodiments, the WiFi transmit/receive signals may be separated in time using switches 516 and 518. For example, the switches 516 and 518 of the RF front-end chip 512 may be used to selectively switch which of the 2.4 GHz and 5 GHz signals from the SAWs 506 and 508, respectively, are transmitted to the PAs 520, 524 and LNAs 522, 526. Switches 516 and 518 may include RF single pole 2 throw (SP2T) switches. The 2.4 GHz and 5 GHz signals are then output to PAs 520, 524 and LNAs 522, 526 for amplification, and the GPS signal is output from the GPS SAW 510 to the LNA 528. The LNAs 522, 526, and 528 may be located on the printed circuit board 500 near the GPS antenna 564 and the WiFi/Bluetooth antenna 562 and may be used to amplify the small signals and to overcome the insertion loss of the transmission line 536. The 2.4 GHz and 5 GHz signals are then output to switches 530 and 532. Switches 530 and 532 may also include SP2T switches and may be used to selectively switch which of the 2.4 GHz and 5 GHz signals from the PAs 520, 524 and LNAs 522, 526 are transmitted to the combiner 534. Each of the 2.4 GHz, 5 GHz, and GPS signals are then input to the combiner 534.

The combiner 534 may include a triplexer. The WiFi and/or Bluetooth 2.4 GHz signal, the WiFi 5 GHz signal, and the GPS signal may be combined using the triplexer 534, or other combining circuit, connected in between the WiFi/Bluetooth RF front-end chip 512 and the rest of the WiFi/Bluetooth modem, including the WiFi/Bluetooth transceiver 540 and the WiFi baseband processor 550. For example, the triplexer 534 may include a high-pass filter for filtering the 5 GHz signals, a band-pass filter for filtering the 2.4 GHz signals, and a low-pass filter for filtering the GPS signals. In some aspects, the triplexer filter 534 may help to isolate the various signals transmitted across the RF transmission line 536.

In some embodiments, the WiFi/Bluetooth RF front-end chip 512 may be controlled using a RF front-end (RFFE)

control interface 560. For example, the RFFE control interface 560 may control the diplexer 504, the triplexer 534, the PAs 520, 526, the LNAs 522, 526, 528, the SWAs 506, 508, 510, the switches 516, 518, 530, 532, and the SMPS/LDO 514 using a common control interface. The common control interface may reduce front-end complexity of the WiFi/Bluetooth modem.

The single RF transmission line 536 may be used to connect the front-end portion 502 of the WiFi/Bluetooth modem to the mobile data modem (MDM) 548, the rest of the WiFi/Bluetooth modem, and the WAN baseband modem. For example, the RF transmission line 536 may carry the WiFI/Bluetooth and GPS signals from the top of the printed circuit board 500 to the bottom where the MDM baseband circuitry 548, the rest of the WiFi/Bluetooth modem, and the WAN modem are located. In some aspects, the RF transmission line 536 may include a strip line or a micro-strip line. The RF transmission line 536 is input to a combiner 538. For example, the combiner 538 may include a triplexer configured to separate the WiFi/Bluetooth and GPS signals transmitted over the single RF transmission line 536 using, for example, a high-pass filter, a band-pass filter, and/or a low-pass filter as described above.

The WiFi and/or Bluetooth signals are output from the triplexer 538 to the WiFi/Bluetooth transceiver 540 included in the remaining portion of the WiFi/Bluetooth RF modem. The WiFi/Bluetooth transceiver 540 may be included on a second chip that is separate from the WiFi/Bluetooth RF front-end chip 512. The WiFi/Bluetooth transceiver 540 includes circuitry configured to down-convert the received RF signals from RF to baseband when signals are received via antenna 562. The WiFi/Bluetooth transceiver 540 further includes circuitry configured to up-convert the baseband signals from baseband to RF for transmission of signals via antenna 562. The circuitry may include one or more LNAs, mixers, synthesizers, filters, voltage controlled oscillators (VCOs), and local oscillator (LO) dividers (none of which are shown). The baseband signals include the in phase (I) and quadrature components (Q) of the complex signal constellation.

The GPS signals are output from the triplexer 538 to the WAN transceiver 542. The WAN transceiver 542 may include a global navigation subsystem (GNSS) 542 for processing the GPS signals. The WAN transceiver 542 may also receive WAN signals using antennas 566, 568 and front-end circuitry 544, 546, which will be further described below. The WAN transceiver 542 chips include circuitry configured to down-convert the received RF signals from RF to baseband for reception via antennas 566 and/or 568, and also circuitry configured to up-convert the baseband signals from baseband to RF for transmission via the antennas 566 and/or 568. The circuitry may include one or more LNAs, mixers, synthesizers, filters, voltage controlled oscillators (VCOs), and local oscillator (LO) dividers (none of which are shown).

The mobile data modem (MDM) 548 may be used to integrate various digital baseband circuitry and includes a WiFi baseband processor 550, interference cancellation circuitry 552, and a WAN baseband processor 554. The application processor (AP) 558 may be used to implement the various applications of the mobile device. In some aspects, a mobile station modem (MSM) may be included on the printed circuit board 500 that integrates the MDM circuitry along with the AP on the same die or chip. For example, the MSM may be a system on chip (SOC) used to integrate the functions of the various components of the chip, such as the modems, microprocessors, graphics, and the like. The MDM power management integrated circuit (PMIC) 556 may be provided to implement various power management functions in order to maximize battery life of the access terminal 106.

As described above, the WiFi/Bluetooth transceiver 540 may receive the 2.4 GHz WiFi and/or Bluetooth signals and the 5 GHz WiFi signals and may convert each of the signals to a baseband signal for processing by the WiFi baseband processor 550 included in the MDM 548. The WiFi baseband processor 550 may include a chip (e.g., CMOS chip) that performs the modem processing, using methods known by persons skilled in the art.

The WAN transceiver 542 may receive the GPS signals for processing by the GNSS. The WAN transceiver 542 may also receive WAN signals using antennas 566, 568 and front-end circuitry 544, 546. Primary RF front-end (FE) circuitry 546 is used to direct the received WAN signal from the primary antenna 568 to the WAN transceiver 542. Receive diversity (RxDiv) FE circuitry 544 is used to direct the received WAN signal from the diversity antenna 566 to the WAN transceiver 542. The WAN transceiver 542 may convert each of the signals to a baseband signal for processing by the WAN baseband processor 554 included in the MDM 548. The WAN baseband processor 554 may include a chip (e.g., CMOS chip) that performs the modem processing, using methods known by persons skilled in the art.

As described above, some WiFi signals may interfere with WAN signals or some WAN signals may interfere with WiFi signals. In order to mitigate interference, the circuit board 500 may also include interference cancellation circuitry 552. For example, the interference cancellation circuitry 552 may include non-linear interference cancellation (NLIC) circuitry. The interference cancellation circuitry 552 may be used to cancel interference between the WiFi/Bluetooth and WAN modems. For example, the interference cancellation circuitry 552 may subtract out any transmit WiFi interference that may be riding upon a received WAN signal. In another example, the interference cancellation circuitry 552 may subtract out any transmit WAN signal interference that may be riding upon a received WiFi signal. The interference cancellation circuitry 552 is able to perform the noise cancellation because both of the WAN and WiFi samples are available in the MDM baseband circuitry and thus can be subtracted from one another.

In some embodiments, any of the WiFi/Bluetooth transceiver 540, the WAN transceiver 542, the RXDiv FE circuitry 544, the Primary RF FE 546, the MDM 548, the AP 558, and/or the MDM PMIC 556 may be located on a single chip. In some aspects, each of the WiFi/Bluetooth transceiver 540, the WAN transceiver 542, the RXDiv FE circuitry 544, the Primary RF FE 546, the MDM 548, the AP 558, and the MDM PMIC 556 may be located on separate chips or may be discrete components on the printed circuit board 500. A person having skill in the art will appreciate that any combination of these components may be combined on one or more chips.

Accordingly, the printed circuit board 500 may be designed so that the WiFi/Bluetooth modem and the WAN modem may be partially integrated on the same die or chip. The integration is made practical by physically separating trhe WiFi/Bluetooth RF front-end portion 502 of the WiFi/Bluetooth modem from the rest of the WiFi/Bluetooth modem, which may be integrated on the same die or chip as the WAN modem circuitry. For example, the WiFi/Bluetooth RF front-end portion 502 includes the WiFi/Bluetooth RF front-end chip 512 and the various other components described above that are separate from the WiFi/Bluetooth transceiver 540 and the WiFi baseband processor located in the MDM 548. Separating the front-end portion 502 from the rest of the WiFi/Bluetooth modem allows integration and co-existence of the WiFi modem with the WAN modem without reducing performance or introducing complicated circuitry and without the challenges discussed above that arise due to the integration of the modems. For example, the front-end portion 502 can receive and parse the signals for transmission over a single RF transmission line 536 to the remaining portion of the WiFi/Bluetooth modem and the WAN modem. The configuration of the circuit board 500 does not require routing of the analog baseband receive and transmit signals, including the in phase (I) and quadrature components (Q) of the complex signal constellation, due to the WiFi/Bluetooth transceiver 540 and baseband circuitry 550 being located near the MDM 548. The transmission line 536 is not routed through an application processor (AP) subsystem 412, which further lowers the complexity of the circuit board 500.

Figure 6:
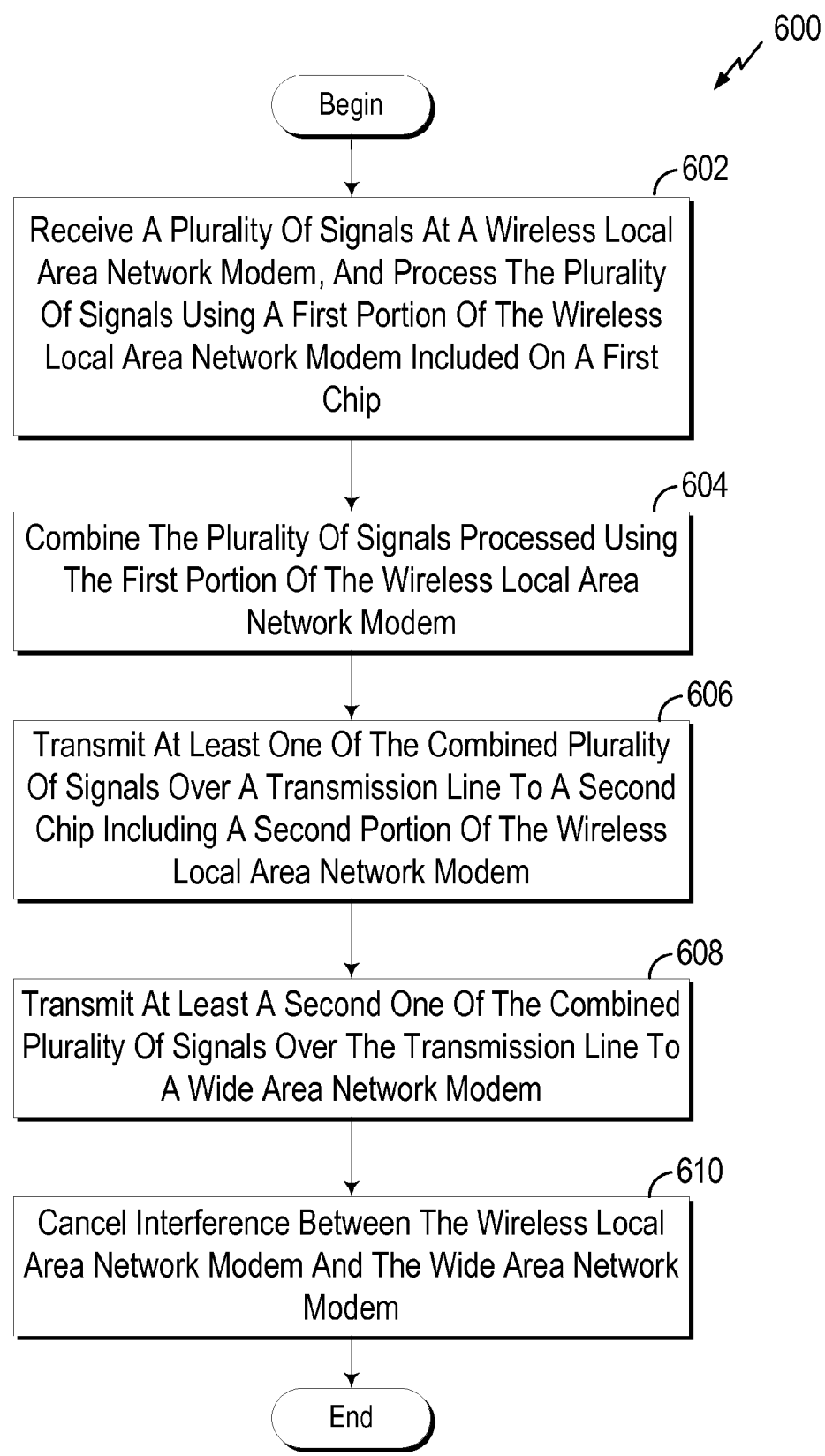
FIG. 6 is a flowchart of an implementation of an exemplary method implemented by a wireless communication apparatus in accordance with some embodiments in accordance with some embodiments.

FIG. 6 illustrates a flowchart of an implementation of an exemplary method 600 implemented by a wireless communication apparatus in accordance with some embodiments. The method 600 may be implemented at a wireless communication apparatus implemented as an access terminal 106, for example. Although the method 600 is described below with respect to elements of the access terminal 106, those having ordinary skill in the art will appreciate that other components may be used to implement one or more of the blocks described herein.

At block 602, the method 600 begins by receiving a plurality of signals at a wireless local area network modem, and processing the plurality of signals using a first portion of the wireless local area network modem included on a first chip. In one embodiment, the wireless local area network modem may include the WiFi/Bluetooth modem, the first portion may include the WiFi/Bluetooth RF front-end portion 502, and the chip may include the RF front-end chip 512, as illustrated in FIG. 5. In some embodiments, the first portion of the wireless local area network modem includes at least one of an antenna, a power amplifier, a surface acoustic wave filter, and a low noise amplifier. For example, as described above with respect to FIG. 5, the antennas 562 and 564 may receive various signals for processing by the front-end portion 502, such as 2.4 GHz WiFi and/or Bluetooth signals and 5 GHz WiFi signals, and the antenna 564 may receive GPS signals. The received signals may be separated using diplexer 504 and output to the SAWs 506, 508, and 510, which are configured to filter the signals and output the appropriate signals to the front-end chip 512 without any unwanted interfering frequencies. In some embodiments, the first portion may also include one or more switches, used to selectively switch which of the signals (e.g., 2.4 GHz and 5 GHz) are transmitted through the first portion to a combining circuit (e.g., combiner 534).

At block 604, the method continues by combining the plurality of signals processed using the first portion of the wireless local area network modem. In some embodiments, the first chip includes a combining circuit configured to combine the plurality of signals processed using the first portion of the wireless local area network modem. For example, the combining circuit may include a triplexer 534 used to combine WiFi and/or Bluetooth 2.4 GHz signals, WiFi 5 GHz signals, and GPS signals. In some embodiments, the combining circuit may filtering the plurality of signals into separate frequencies. For example, the combining circuit may include a high-pass filter for filtering the 5 GHz signals, a band-pass filter for filtering the 2.4 GHz signals, and a low-pass filter for filtering the GPS signals. In some embodiments, the combining circuit may help to isolate the various signals transmitted across the RF transmission line 536. In some embodiments, the combining circuit includes a diplexer, for example if only two signals are received.

At block 606, the method includes transmitting at least one of the combined plurality of signals over a transmission line to a second chip including a second portion of the wireless local area network modem. In some embodiments, the second portion includes the WiFi/Bluetooth transceiver 540 located on a separate chip than the front-end portion 502 and/or the WiFi portion of the MDM. The at least one of the combined plurality of signals may include WiFi and/or Bluetooth signals. The second portion of the wireless local area network modem may include circuitry configured to down-convert the received RF signals from RF to baseband for reception via an antenna and also circuitry configured to up-convert the baseband signals from baseband to RF for transmission via the antenna. For example, in some embodiments, the second portion of the wireless local area network modem includes at least one of a low noise amplifier, a mixer, a synthesizer, a filter, a voltage controlled oscillator, and a local oscillator divider.

At block 608, the method continues by transmitting at least a second one of the combined plurality of signals over the transmission line to a wide area network modem. In some embodiments, the wide area network modem includes the WAN modem, including the WAN transceiver 542, antennas 544, 546, and the WAN portion of the MDM 548. For example, the second one of the combined plurality of signals may include GPS signals that may be processed by the GNSS portion of the WAN transceiver 542. For example, a WAN transceiver 542 may receive the GPS signals for processing by the GNSS. In some embodiments, the method may further include receiving one or more WAN signals at the wide area network modem. For example, the WAN transceiver 542 may receive WAN signals using antennas 566, 568 and front-end circuitry 544, 546, as described above. The WAN transceiver 542 may convert each of the signals to a baseband signal for processing by a WAN baseband processor 554 included in the MDM 548.

At block 610, the method further includes canceling interference between the wireless local area network modem and the wide area network modem. In some embodiments, a data modem is configured to cancel the interference between the wireless local area network modem and the wide area network modem, the data modem including a wireless local area network baseband processor and a wide area network baseband processor. For example, as previously described herein, WiFi signals may interfere with received WAN signals or WAN signals may interfere with received WiFi signals. Interference cancellation circuitry 552 may be used to mitigate this interference. For example, interference cancellation circuitry 552 may cancel interference between the WiFi/Bluetooth and WAN modems by subtracting out any transmit WiFi interference that may be riding upon a received WAN signal and/or subtracting out any transmit WAN signal interference that may be riding upon a received WiFi signal.

Figure 7:
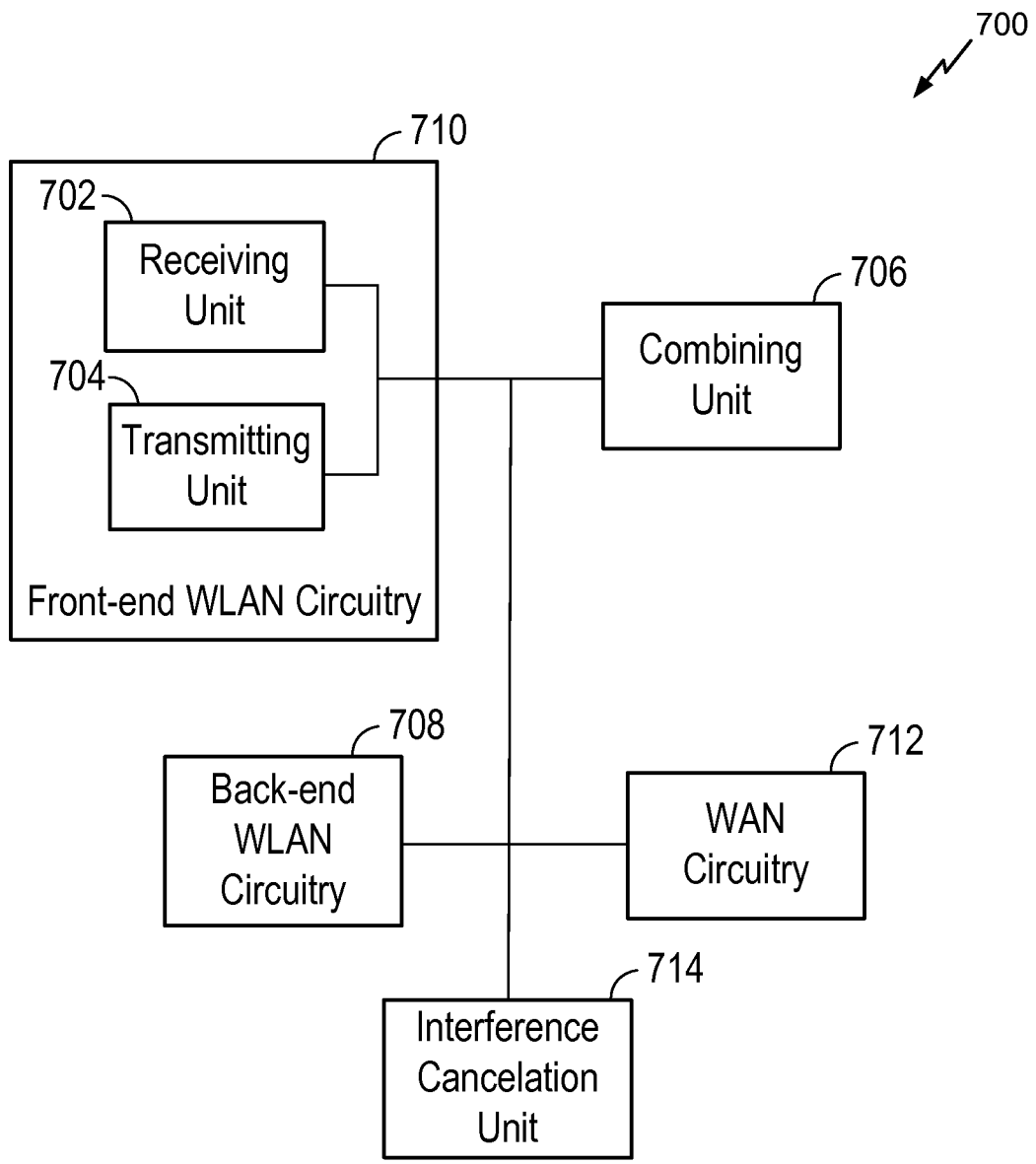
FIG. 7 is a functional block diagram of an exemplary wireless communication apparatus that may be employed within the wireless communication system in accordance with some embodiments.

FIG. 7 is a functional block diagram of an exemplary wireless communication apparatus 700 that may be employed within the wireless communication system 100 in accordance with some embodiments. Those skilled in the art will appreciate that a wireless communication device 700 may have more components, such as any one or more of the components shown in FIGS. 3 and/or 5. The wireless communication device 700 shown includes only those components useful for describing some prominent features of certain embodiments.

The device 700 includes front-end WLAN circuitry 710. In some embodiments, the front-end WLAN circuitry 710 includes a first portion of a WLAN modem and may be included in a first chip. For example, the front-end WLAN circuitry 710 may include the WiFi/Bluetooth RF front-end portion 502 described above with respect to FIG. 5. The WLAN circuitry 710 includes a receiving unit 702 and a transmitting unit 704. In some cases, a means for receiving may include the receiving unit 702. In some embodiments, the receiving unit 702 may include a single receive circuit or a plurality of receive circuits including the first receive circuit. For example, the receive circuit or the plurality of receive circuits may include one or more of receive circuits 340a, 340b, through 340n. In another example, the receiving unit 702 may include one or more of the components of the front-end portion 502 illustrated in FIG. 5, such as a WiFi/Bluetooth antenna 562, a GPS antenna 564, a diplexer 504, one or more WiFi/Bluetooth surface acoustic wave filters (SAWs) 506, 508 (e.g., a 2.4 GHz SAW and a 5 GHz SAW), a GPS SAW 510, power amplifiers (PA) 520, 524, low noise amplifiers (LNA) 522, 526, 528, switches 516, 518, 530, 532 (e.g., single pole 2 throw (SP2T) switches), and a combiner 534 (e.g., a triplexer). The receiving unit 702 may be configured to perform, alone or in combination with other components of the device 700, one or more of the functions described above with respect to block 602 of FIG. 6. For example, the receiving unit 702 may be configured to, at least, receive a plurality of signals at a wireless local area network modem, and processing the plurality of signals using a first portion of the wireless local area network modem included on a first chip.

The device 700 further includes a transmitting unit 704. In some cases, a means for transmitting may include a transmitting unit 704. In some embodiments, the transmitting unit 704 may include a plurality of transmit circuits, such as transmit circuits 330a, 330b, through 330n. In another example, the transmitting unit 702 may include one or more of the components of the front-end portion 502 illustrated in FIG. 5, such as a WiFi/Bluetooth antenna 562, a GPS antenna 564, a diplexer 504, one or more WiFi/Bluetooth surface acoustic wave filters (SAWs) 506, 508 (e.g., a 2.4 GHz SAW and a 5 GHz SAW), a GPS SAW 510, power amplifiers (PA) 520, 524, low noise amplifiers (LNA) 522, 526, 528, switches 516, 518, 530, 532 (e.g., single pole 2 throw (SP2T) switches), and a combiner 534 (e.g., a triplexer). These components may be used to process a transmitted WLAN signal.

The device 700 further includes a combining unit 706. For example, the combining unit 706 may include the combiner 534, such as a triplexer. In some cases, a means for combining may include a combining unit 706. For example, the combining unit 706 may be configured as a means for combining the plurality of signals processed using the front-end WLAN circuitry 710, which includes the first portion of the WLAN modem. In some embodiments, the combining unit 706 may be configured to perform one or more of the functions described above with respect to block 604 of FIG. 6.

The device 700 further includes back-end WLAN circuitry 710 and WAN circuitry 712. In some embodiments, back-end WLAN circuitry 710 may be located on a separate chip than the front-end WLAN circuitry 710, and may include the WiFi/Bluetooth transceiver 540 and/or the WiFi portion of the MDM 548. In some embodiments, the WAN circuitry 712 may be part of a WAN modem and may include the WAN transceiver 542, antennas 544, 546, and the WAN portion of the MDM 548. In some cases, a means for transmitting may also include the combining unit 706. For example, the combining unit 706 may be configured as a means for transmitting at least one of the combined plurality of signals to a second chip including the back-end WLAN circuitry 710, which includes a second portion of the WLAN modem, and as a means for transmitting at least a second one of the combined plurality of signals to the WAN circuitry 712. In some embodiments, the combining unit 706 may be configured to perform one or more of the functions described above with respect to blocks 606 and 608 of FIG. 6.

The device 700 may further include an interference cancellation unit 714. In some embodiments, the interference cancellation unit 714 may include the interference cancellation circuitry 552 illustrated in FIG. 5, such as a non-linear interference cancellation (NLIC) circuit. A means for canceling may include the interference cancelation unit 714. For example, the interference cancelation unit 714 may be configured as a means for canceling interference between the WLAN modem and the WAN modem. In some embodiments, the interference cancelation unit 714 may be configured to perform one or more of the functions described above with respect to block 610 of FIG. 6.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-15 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the embodiments described in this disclosure may be readily apparent to those skilled in the art, and the generic principles defined herein may be applied to other embodiments without departing from the spirit or scope of this disclosure. Thus, the disclosure is not intended to be limited to the embodiments shown herein, but is to be accorded the widest scope consistent with the claims, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments.

Certain features that are described in this specification in the context of separate embodiments also can be implemented in combination in a single embodiment. Conversely, various features that are described in the context of a single embodiment also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:
1. A wireless communication apparatus comprising:
a wireless local area network modem including:
    a first front-end portion of the wireless local area network modem configured to receive a first plurality of radio-frequency signals via a first antenna and process the first plurality of radio-frequency signals; and
    a second portion of the wireless local area network modem physically separated from the first front-end portion and configured to process at least a first one of the first plurality of radio-frequency signals;
a wide area network modem configured to process at least a second one of the first plurality of radio-frequency signals received from the first front-end portion and a second plurality of radio-frequency signals received from a second front-end portion;
a combining circuit configured to combine the first plurality of radio-frequency signals processed by the first front-end portion of the wireless local area network modem;
a transmission line configured to transmit the combined first plurality of radio-frequency signals to the second portion of the wireless local area network modem and the wide area network modem; and a data modem including interference cancellation circuitry configured to cancel interference between the wireless local area network modem and the wide area network modem.

2. The wireless communication apparatus of claim 1, wherein the first front-end portion of the wireless local area network modem includes at least one of a power amplifier, a surface acoustic wave filter, and a low noise amplifier.

3. The wireless communication apparatus of claim 1, wherein the first front-end portion and the second portion of the wireless local area network modem are physically separated by a distance of at least 1 inch.

4. The wireless communication apparatus of claim 1, wherein the second portion of the wireless local area network modem includes at least one of a low noise amplifier, a mixer, a synthesizer, a filter, a voltage controlled oscillator, and a local oscillator divider.

5. The wireless communication apparatus of claim 1, wherein the combining circuit is configured to filter the first plurality of radio-frequency signals into separate frequencies.

6. The wireless communication apparatus of claim 5, wherein the separate frequencies include 2.4 GHz, 5 GHz, and global positioning system frequencies.

7. The wireless communication apparatus of claim 5, wherein the combining circuit includes at least one of a diplexer and a triplexer.

8. The wireless communication apparatus of claim 1, further comprising a baseband processor for a first radio access technology associated with the wireless local area network modem and a baseband processor for a second radio access technology associated with the wide area network modem.

9. The wireless communication apparatus of claim 1, wherein the first front-end portion of the wireless local area network modem is located on a first chip and the second portion of the wireless local area network modem, the wide area network modem, and the interference cancellation circuitry are integrated on a second chip.

10. The wireless communication apparatus of claim 1, wherein a first radio access technology associated with the wireless local area network modem is different from a second radio access technology associated with the wide area network modem.

11. A method implemented in a wireless communication apparatus, the method comprising:
receiving a first plurality of radio-frequency signals from a first antenna at a first front-end portion of a wireless local area network modem;
processing the first plurality of radio-frequency signals using the first front-end portion of the wireless local area network modem to define at least two first processed radio-frequency signals;
combining by a combining circuit each of the at least two first processed radio-frequency signals after processing by the first front-end portion of the wireless local area network modem;
transmitting the at least two first processed radio-frequency signals over a transmission line to a second portion of the wireless local area network modem physically separated from the first front-end portion;
processing, by the second portion of the wireless local area network modem, at least a first one of the at least two first processed radio-frequency signals received from the transmission line;
processing, by a wide area network modem, a second one of the at least two first processed radio-frequency signals received from the transmission line and a second plurality of radio-frequency signals received from a second front-end portion connected to a second antenna; and
canceling interference between the wireless local area network modem and the wide area network modem using a data modem including interference cancellation circuitry.

12. The method of claim 11, wherein the first front-end portion of the wireless local area network modem includes at least one of a power amplifier, a surface acoustic wave filter, and a low noise amplifier.

13. The method of claim 11, wherein the first front-end portion and the second portion of the wireless local area network modem are physically separated by a distance of at least 1 inch.

14. The method of claim 11, wherein the second portion of the wireless local area network modem includes at least one of a low noise amplifier, a mixer, a synthesizer, a filter, a voltage controlled oscillator, and a local oscillator divider.

15. The method of claim 11, further comprising filtering the first plurality of radio-frequency signals into separate frequencies using the combining circuit.

16. The method of claim 15, wherein the separate frequencies include 2.4 GHz, 5 GHz, and global positioning system frequencies.

17. The method of claim 11, wherein the combining circuit includes at least one of a diplexer and a triplexer.

18. The method of claim 11, wherein the data modem includes a baseband processor for a first radio access technology associated with the wireless local area network modem and a baseband processor for a second radio access technology associated with the wide area network modem.

19. The method of claim 11, wherein the first front-end portion of the wireless local area network modem is located on a first chip, and the second portion of the wireless local area network modem and the wide area network modem are integrated on a second chip with the interference cancellation circuitry.

20. A wireless communication apparatus, comprising:
a wireless local area network modem including:
a first front-end portion of the wireless local area network modem configured to receive a first plurality of radio-frequency signals via a first antenna and process the first plurality of radio-frequency signals; and
a second portion of the wireless local area network modem physically separated from the first front-end portion and configured to process at least a first one of the first plurality of radio-frequency signals;
a wide area network modem configured to process at least a second one of the first plurality of radio-frequency signals received from the first front-end portion and a second plurality of radio-frequency signals received from a second front-end portion;
means for combining the first plurality of radio-frequency signals processed by the first front-end portion of the wireless local area network modem;
means for transmitting the combined first plurality of radio-frequency signals to the second portion of the wireless local area network modem and the wide area network modem; and
means for canceling interference between the wireless local area network modem and the wide area network modem.

21. The wireless communication apparatus of claim 20, wherein the first front-end portion of the wireless local area network modem includes at least one of a power amplifier, a surface acoustic wave filter, and a low noise amplifier.

22. The wireless communication apparatus of claim 20, wherein the first front-end portion and the second portion of the wireless local area network modem are physically separated by a distance of at least 1 inch.

23. The wireless communication apparatus of claim 20, wherein the second portion of the wireless local area network modem includes at least one of a low noise amplifier, a mixer, a synthesizer, a filter, a voltage controlled oscillator, and a local oscillator divider.

24. The wireless communication apparatus of claim 20, wherein the means for combining is configured to filter the first plurality of radio-frequency signals into separate frequencies.

25. The wireless communication apparatus of claim 24, wherein the separate frequencies include 2.4 GHz, 5 GHz, and global positioning system frequencies.

26. The wireless communication apparatus of claim 24, wherein the means for combining includes at least one of a diplexer and a triplexer.

27. The wireless communication apparatus of claim 20, wherein the first front-end portion of the wireless local area network modem is located on a first chip and the second portion of the wireless local area network modem, the wide area network modem, and the means for canceling interference between the wireless local area network modem and the wide area network modem are integrated on a second chip.

* * * * *